(12) United States Patent
Condello et al.

(10) Patent No.: US 10,076,881 B2
(45) Date of Patent: Sep. 18, 2018

(54) SYSTEM AND METHOD FOR FORMING A BASE LAYER WITH INTERFACIAL ANCHORING TO STABILIZE A THREE-DIMENSIONAL OBJECT DURING ADDITIVE MANUFACTURING

(71) Applicant: Xerox Corporation, Norwalk, CT (US)

(72) Inventors: Anthony S. Condello, Webster, NY (US); Jack T. Lestrange, Macedon, NY (US); Jorge A. Alvarez, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 148 days.

(21) Appl. No.: 15/259,773

(22) Filed: Sep. 8, 2016

(65) Prior Publication Data

US 2018/0065323 A1 Mar. 8, 2018

(51) Int. Cl.
| | |
|---|---|
| *B29C 67/00* | (2017.01) |
| *B33Y 10/00* | (2015.01) |
| *B33Y 30/00* | (2015.01) |
| *B33Y 50/02* | (2015.01) |

(52) U.S. Cl.
CPC ...... *B29C 67/0092* (2013.01); *B29C 67/0059* (2013.01); *B29C 67/0088* (2013.01); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| | | |
|---|---|---|
| 9,216,544 B2 | 12/2015 | Swanson et al. |
| 2014/0178585 A1* | 6/2014 | Swanson ............... B05C 13/00 427/256 |
| 2014/0178588 A1 | 6/2014 | Swanson et al. |
| 2016/0121548 A1* | 5/2016 | Nauka ................ B29C 67/0088 264/308 |

\* cited by examiner

*Primary Examiner* — Nathan T Leong
(74) *Attorney, Agent, or Firm* — Maginot Moore & Beck LLP (57) ABSTRACT

A method of forming a base for supporting a three-dimensionally printed object includes operating at least one ejector of a three-dimensional object printer to form the base. At least one ejector is operated to eject build material to form a planar layer of build material on a platen, and to form a first plurality of anchoring portions on the planar layer. At least one ejector is operated to eject support material to form a plurality of second anchoring portions interlocked with the first anchoring portions so that the first and second anchoring portions form a planar anchoring layer, and to form a planar layer of support material on the anchoring layer that defines a planar base for supporting a three-dimensional object.

8 Claims, 6 Drawing Sheets

SYSTEM AND METHOD FOR FORMING A BASE LAYER WITH INTERFACIAL ANCHORING TO STABILIZE A THREE-DIMENSIONAL OBJECT DURING ADDITIVE MANUFACTURING

TECHNICAL FIELD

This disclosure relates generally to three-dimensional object printing, and, in particular, to the anchoring of a three-dimensionally printed object during printing.

BACKGROUND

Digital three-dimensional object manufacturing, also known as digital additive manufacturing, is a process of making a three-dimensional solid object of virtually any shape from a digital model. Three-dimensional object printing is an additive process in which successive layers of material are formed on a substrate in different shapes, and is distinguishable from traditional object-forming techniques, which mostly rely on the removal of material from a work piece by a subtractive process, such as cutting or drilling. The layers can be formed by ejecting binder material, directed energy deposition, extruding material, ejecting material, fusing powder beds, laminating sheets, or exposing liquid photopolymer material to a curing radiation.

In one or more of these methods, ejector heads are used. Typically, ejector heads, which are similar to printheads in document printers, include an array of ejectors that are coupled to a supply of material. Ejectors within a single ejector head can be coupled to different sources of material or each ejector head can be coupled to different sources of material to enable all or some of the ejectors in an ejector head to eject drops of the same material. Materials that become part of the object being produced are called build materials, while materials that are used to provide structural support during object formation, but are later removed from the object, are known as support materials. Generally, both build materials and support materials are ejected during the formation of each layer to form build portions of a three-dimensional object with build material and form support portions with the support material that support the build portions.

The substrate on which the layers are formed is generally referred to as a build platen. At least one of the build platen and the material deposition devices of the printer are connected to actuators for controlled movement to produce the layers that form the object. Preferably, the object is supported by the build platen during the printing process to facilitate an accurate print, and is removable from the build platen after the conclusion of the printing process without a risk of damaging the object. Conventional techniques, however, generally pose a risk of warping the object during printing and difficulty may be encountered when the object is removed from the build platen.

Figure 9:
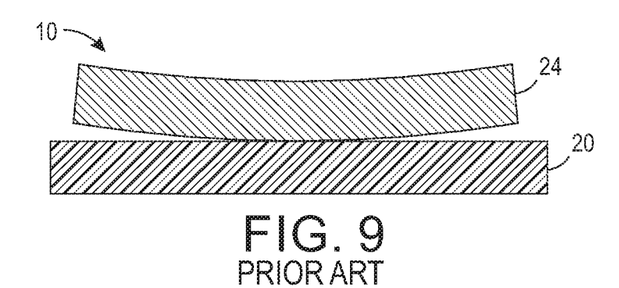
FIGS. 9-11 are side cross section views of different known configurations for forming three-dimensional objects on a platen using an additive manufacturing system.

During the printing process, the build material and support material generally harden in response to cooling, curing, or a similar process. When different portions of a printed object harden at different rates because different materials are used or the portions have different shapes, the object can warp and become distorted. An example of a warped three-dimensionally printed object 10 on a build platen 20 is illustrated in FIG. 9.

One technique used to address this warping issue is to have the object at least partially adhere to the surface of the build platen during printing. The adhered portions of the object are held in place on the surface of the build platen so that the shape of the object is maintained during the printing process and during hardening. A disadvantage of this technique, however, is that removing the adhered portions of the object from the surface of the build platen can be difficult. In particular, when portions of the object formed with build material directly adhere to the build platen, removing the object mechanically can pose a risk of damaging the object.

Techniques have been developed that attempt to address these issues. In one example, build platens have been developed that include heating elements which can be operated in order to heat a base portion of the object to soften the build and support material and facilitate removal from the build platen. Such heaters not only add time to the build process, but also add expense and complexity to the build platen. Additionally, the local heating from the heater can introduce new risks of warping the completed object.

Figure 10:
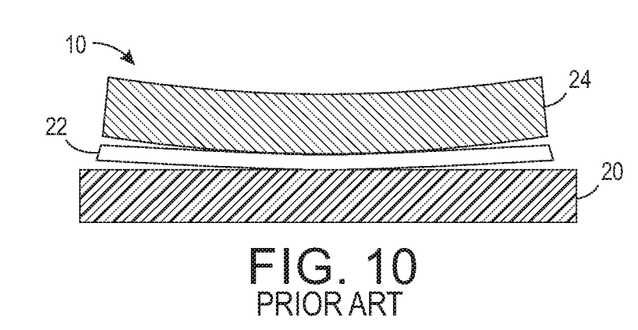
Figure 11:
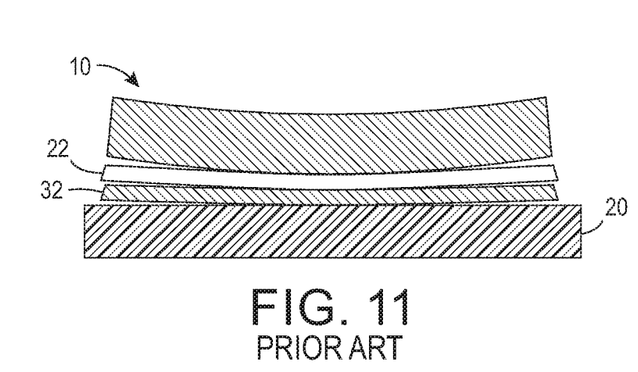

In another example, a base layer of support material is formed prior to depositing the layers of build and support material to form the object. Because the base layer of support material is disposed between the build platen and any portions of the object formed with build material, no build material portions of the object adhere to the build platen. Additionally, support material is generally easier to remove from a substrate than build material. A disadvantage of this technique, however, is that support material generally forms weak adherence to surrounding surfaces, and does not provide sufficient resistance against warping. FIG. 10 illustrates an example of a three-dimensionally printed object 10 that includes a base layer of support material 22 between the layers forming the object 24 and the build platen 20, and is nevertheless warped. FIG. 11 illustrates another example of a warped three-dimensionally printed object 00 that is similar to the object 10 in FIG. 10 but additionally includes a further base layer of build material 32 disposed between the base layer of support material 22 and the build platen 20.

In a further technique, build platens have been developed that define a surface having a plurality of cavities. During the build process, an initial layer of material fills in the cavities in the build platen, and the portions of material within the cavities anchor the object onto the surface of the build platen during printing. In one example of this technique, the initial layer includes a bottom layer of build material of the object being printed. As a result, at least a portion of the printed object includes protrusions that were not part of the original design of the object. Such protrusions generally at least partially adhere to the cavities, and can increase the difficulty of removing the object from the build platen. The protrusions are also a contiguous part of the released object but are not part of the original design. Removing the protrusions in order to achieve an object with the original design can be difficult, and may require additional cleaning such as sanding, cutting, or the like.

In another example, a platen formed from a destructible material such as corrugated cardboard is used, and the initial layer is formed from support material. In order to compensate for the generally weaker strength of the support material, the cavities have a narrowed neck portion so as to form mushroom-like portions of support material within the build platen that locks the object in place with a form fit. As a result of the form fit, removing the object from the build platen requires destroying the platen. In addition to requiring that the platen is replaced for each printing operation, the destructible material that forms the platen may limit materials that can be used as build material and support material.

Therefore, a technique for forming three-dimensional objects that resists warping, that facilitates removal from the build platen, and that does not rely on expensive or complex build platens would be beneficial.

SUMMARY

An additive manufacturing system enables three-dimensional objects to be printed more accurately and with less warping. The system includes at least one ejector configured to eject drops of build material, at least one ejector configured to eject drops of support material, a platen, and a controller that is operatively connected to the at least one ejector configured to eject drops of build material and to the at least one ejector configured to eject drops of support material. The controller is configured to operate the at least one ejector configured to eject drops of build material and the at least one ejector configured to eject drops of support material to form a planar base for supporting a three-dimensional object to be formed by the three-dimensional object printer, such as via the method discussed below.

A method of operating an additive manufacturing system enables three-dimensional objects to be printed more accurately and with less warping. The method includes operating at least one ejector of the additive manufacturing system to eject drops of build material and drops of support material to form a planar base for supporting a three-dimensional object to be formed by the three-dimensional object printer. At least one ejector is operated by a controller of the additive manufacturing system to eject drops of build material onto a platen of the additive manufacturing system to form a layer of build material on the platen. The at least one ejector is operated by the controller to eject drops of build material onto the planar layer of build material to form a plurality of first anchoring portions. The at least one ejector is operated by the controller to eject drops of support material onto the planar layer of build material to fill spaces between the plurality of first anchoring portions and form a plurality of second anchoring portions interlocked with the first anchoring portions. The plurality of first anchoring portions and the plurality of second anchoring portions together form a planar anchoring layer. The at least one ejector is operated by the controller to eject drops of support material onto the planar anchoring layer to form a planar layer of support material that covers the planar anchoring layer and connects the support material of the second plurality of anchoring portions to each other. The planar layer of support material forms a planar base for supporting a three-dimensional object to be formed by the additive manufacturing system.

BRIEF DESCRIPTION OF THE DRAWINGS

The foregoing aspects and other features of the present disclosure are explained in the following description, taken in connection with the accompanying drawings.

DETAILED DESCRIPTION

For a general understanding of the present embodiments, reference is made to the drawings. In the drawings, like reference numerals have been used throughout to designate like elements.

Figure 1:
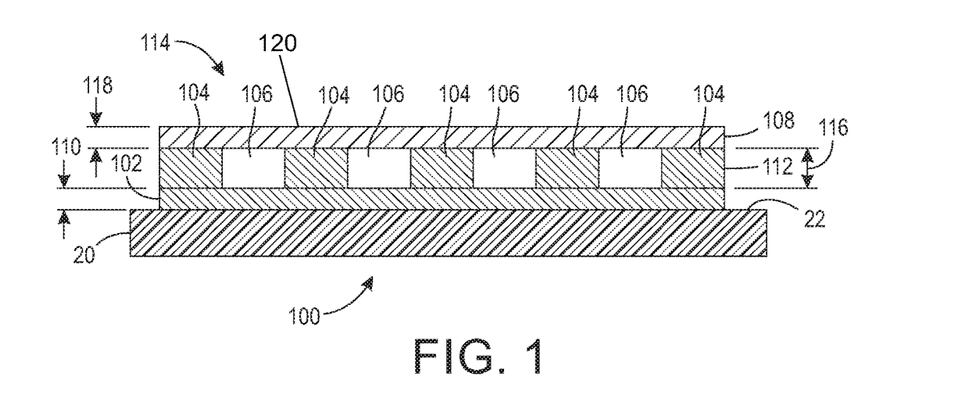
FIGS. 1 and 2 are side cross section views of different exemplary embodiments of a planar base for supporting a three-dimensional object to be formed by a three-dimensional object printer according to this disclosure.

FIG. 1 illustrates a side view of an exemplary embodiment of a base 100 that can be formed by the system and method disclosed in this document to stabilize a three-dimensional object during its manufacture. The base 100 is formed on a platen 20, and includes a planar layer of build material 102, a plurality of first anchoring portions 104 formed with the build material, a plurality of second anchoring portions 106 formed with support material, and a planar layer of support material 108.

The platen 20 can be any acceptable type of platen. In this embodiment, the platen 20 is a conventional platen having a planar surface 22. In other embodiments, platens with other types of surfaces are also contemplated. In other words, the base 100 is not specific to a platen with a surface having a particular shape, and can be formed on platens having a variety of different shapes. The platen 20 can include any acceptable materials for supporting a three-dimensional object during printing. In this embodiment, the platen 20 includes a metal such as anodized aluminum, but other materials are also contemplated in other embodiments.

The planar layer of build material 102 is disposed directly on the surface 22 on the platen 20. A height 110 of the planar layer 102 is small relative to a planar area of the layer 102. In this embodiment, the height 110 is less than 1 millimeter, or more particularly less than 400 micrometers, or more exactly approximately 200 micrometers. As used herein, the term "layer" means one or more successively deposited thicknesses of material that together form a contiguous region. For example, while illustrated in FIG. 1 as a single layer, the planar layer 102 may include a plurality of successively deposited thicknesses of build material. Three-dimensional printers have been developed that are configured to deposit material in thicknesses of 10-20 micrometers or less. As successive thicknesses are deposited, they can together form a contiguous layer such as the planar layer 102. Thus, a plurality of portions of build material having a thickness of 10-20 micrometers can be successively deposited to form the planar layer 102 having a height of approximately 200 micrometers.

The relatively small magnitude of the height 110 enables the planar layer 102 to harden at a substantially consistent rate over the entire height 110 of the planar layer 102. In other words, bottom regions proximate to the platen 20 harden at substantially the same rate as top regions distal from the platen 20. The consistent hardening rate of the planar layer 102 reduces a risk of warping for the planar layer 102, since any change in volume of the planar layer 102 due to hardening occurs substantially isomophically.

At least during a printing process to form a three-dimensional object on the base 100, at least a portion of the planar layer 102 adheres to the surface 22 of the platen 20. The at least partial adherence acts to maintain the planar shape of the planar layer 102 and increases a resistance to warping for the planar layer 102. In other words, the at least partial adherence of the planar layer 102 to the surface 22 of the platen 20 acts as a restoring force configured to counteract external forces that may otherwise act on the planar layer 102 and cause warping.

The plurality of first anchoring regions 104 are formed from build material and are spaced apart from each other directly on the planar layer 102. While FIG. 1 illustrates the first anchoring regions 104 as distinct elements from the planar layer 102, the first anchoring regions 104 and the planar layer 102 are formed from contiguous portions of build material.

The plurality of second anchoring portions 106 are formed from support material and are disposed directly on the planar layer 102 to fill the spaces between the first anchoring regions 104. In one embodiment, the second anchoring portions 106 are formed after the first plurality of anchoring portions 106 have been formed. In another embodiment, the first anchoring regions 104 and second anchoring regions 106 are formed in concert, such as by successively depositing a plurality of layers that each include both build material and support material.

The first anchoring regions 104 and the second anchoring regions 106 together form a planar anchoring layer 112 with an interlocked structure 114. The planar anchoring layer 112, and thus each of the first anchoring regions 104 and second anchoring regions 106, has a height 116 that is greater than the height 110 of the planar layer of build material 102. In this embodiment, the planar anchoring layer 112 has a height 116 of about 0.5 millimeters to about 5 millimeters, or more particularly of about 1 millimeter to about 3 millimeters, or more exactly approximately 2 millimeters. Although the height 116 of the planar anchoring layer 112 is greater than the height 110 of the planar layer 102, the planar layer 112 is resistant to warping due to the interlocking structure 114 as discussed in further detail below.

The planar layer of support material 108 is disposed directly on the planar anchoring layer 112 to connect the support material of the planar layer 108 with the support material of the second anchoring portions 106 and define a planar base 120 for supporting a three-dimensional object to be formed thereon by a three-dimensional object printer. The planar layer 108 has a height 118 that is small relative to the height 116 of the planar anchoring layer 112. In this embodiment, the planar layer 108 has a height 116 that is approximately equal to the height 110 of the planar layer of build material 102. In other embodiments, other heights 118 for the planar layer 108 are also contemplated. The relatively small height 118 of the planar layer 108 reduces a risk of warping of the planar layer 108. The interlocking structure 114 of the first anchoring regions 104 and second anchoring regions anchors the planar layer 108 to the planar layer 102.

The interlocked structure 114 is configured to resist warping. In particular, the interlocked structure 114 is configured to restrict the support material of the planar layer 108 from shearing away from build material disposed on the planar base 120, and is further configured to restrict the support material of the second anchoring regions 106 and the planar layer 108 from shearing away from the build material of the planar layer of build material 102 and the first anchoring regions 104. The relatively larger height 116 of the anchoring layer 112 increases an area of interaction between the support material and the build material in directions transverse to the surface 22 of the platen 20. Such transverse surface area inhibits shearing and thus increases a warping resistance of the base 100.

Figure 2:
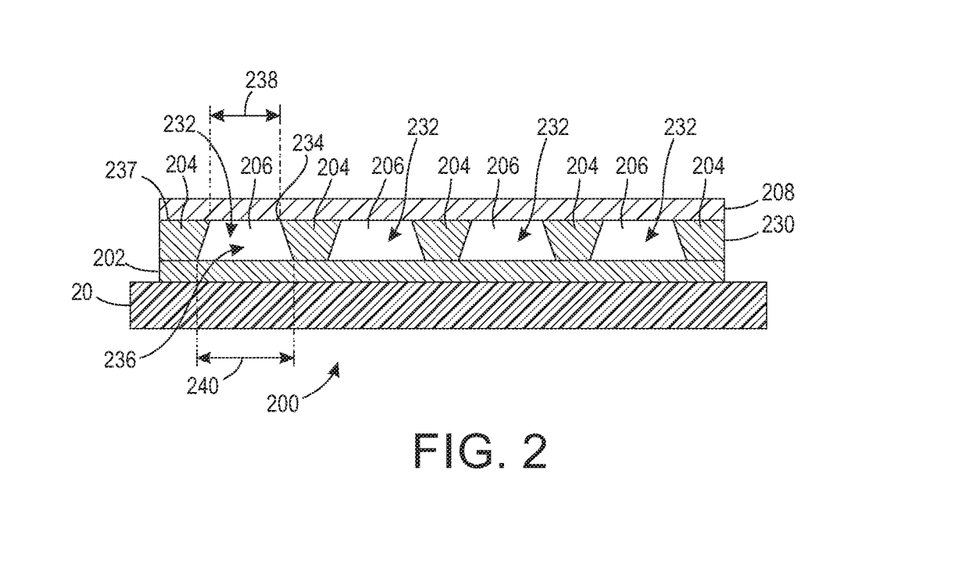

FIG. 2 illustrates a side view of another exemplary embodiment of a base 200 according to this disclosure. The base 200 is formed on a platen 20, and includes a planar layer of build material 202, a plurality of first anchoring portions 204 formed with the build material, a plurality of second anchoring portions 206 formed with support material, and a planar layer of support material 208.

In this embodiment, the first anchor portions 204 are formed from a layer of build material 230 that defines a plurality of cavities 232. Each cavity 232 includes a first portion 234 embedded within the layer 230 and a second portion 236 interposed between the first portion 234 and an upper surface 237 of the layer 230. The second anchoring portions 206 are formed from portions of support material filling the cavities 232.

The first portion 236 of each cavity 232 has a cross sectional area 240 that is wider than a cross sectional area 238 of the second portion 234. In other words, each cavity 232 is defined by an at least partially convex shape. In this embodiment, sidewalls of the second portions 234 are contiguous with sidewalls of the first portions 236 to form the cavities with a contiguous tapering shape. In particular, the cavities 232 in this embodiment have a substantially trapezoidal shaped cross section. In other embodiments, such as the examples discussed below, other cross section shapes for the cavities 232 are also contemplated.

The at least partially concave shape of the cavities 232 enables a locking fit with the second anchoring portions 206. Support material disposed within the first portion 234 of a cavity 232 is restrained within the first portion 234 due to the smaller cross sectional area 240 of the second portion and acts to anchor the support material of the planar layer 208 in place and resist warping.

Figure 3:
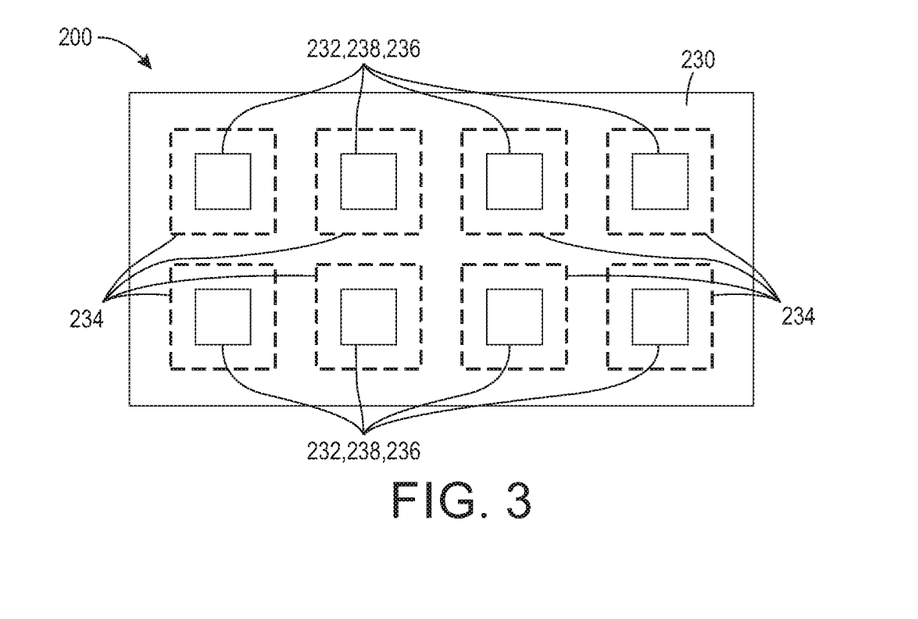
FIG. 3 is a top view of the planar base of FIG. 2.

FIG. 3 illustrates a top view of the base 200 with the planar layer of support material 208 removed to reveal the layer 230. The second portions 236 define openings 238 into the cavities 232, and the first portions 234 define portions of the cavities 232 set back from the openings 238. In this embodiment, the cavities 232 are regularly spaced along the layer 230 to form a pattern. In this embodiment, the pattern is a block pattern, but other patterns are also contemplated in other embodiments, such as a checkerboard pattern, and the like. In one embodiment, the cavities are arranged at locations corresponding to regions of a three-dimensional object to be formed on the base 200 that have a higher risk of warping relative to other regions. In another embodiment, the cavities are arranged in an irregular configuration.

Figure 4:
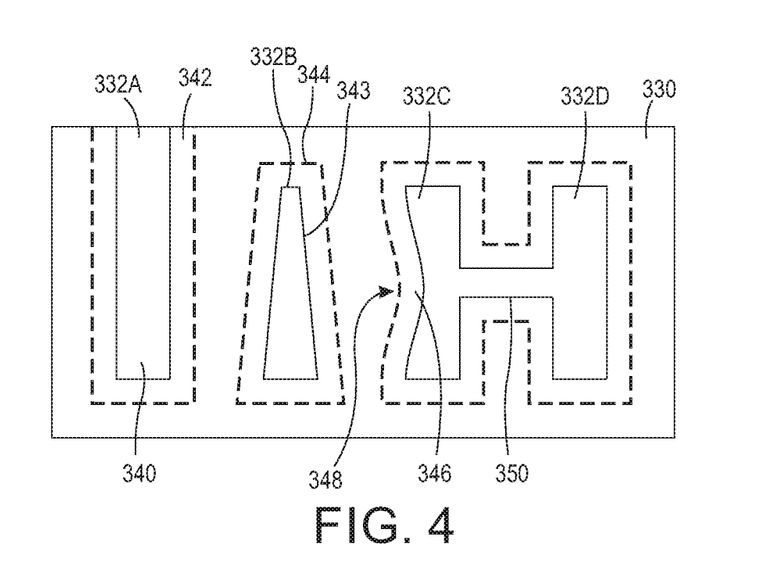
FIG. 4 is a top view of another exemplary embodiment of a planar base for supporting a three-dimensional object to be formed by a three-dimensional object printer according to this disclosure.

Additionally, while the cavities 232 illustrated in FIG. 3 have a substantially regular profile when viewed from above, in particular a substantially square profile, other profiles are also contemplated. FIG. 4 illustrates a top view of another exemplary embodiment of a layer of build material 330 that is similar to the layer 230, but defines cavities 332A-D having different profiles viewed from above.

The cavity 332a is defined by a substantially prismatic trough 340. In this embodiment, the trough extends to at least one edge 342 of the layer 330. The cavity 332B has a profile that includes a taper 343 towards a first end 344 of the cavity 332B. The cavity 332C includes a taper 346 in a middle region 348 of the cavity 332C. The cavities 332C and 332D are connected to each other via a connecting region 350. Other profiles of cavities are also contemplated in other embodiments. Profiles for one or more cavities defined in the layers 230, 330 can be selected in order to optimize a printing time, an amount of build material used, support and warping resistance of an object to be formed on the base 200, 300, or for other reasons.

Figure 5:
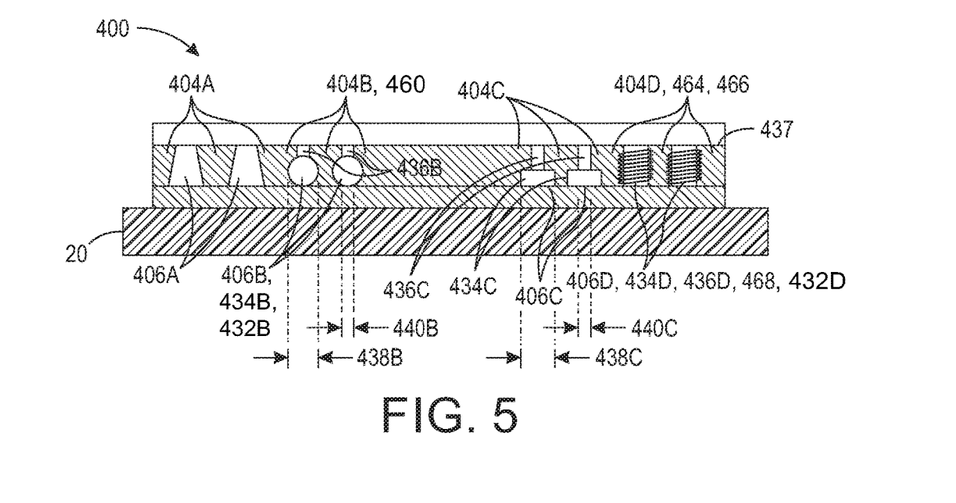
FIGS. 5 and 6 are side cross section views of further different exemplary embodiments of a planar base for supporting a three-dimensional object to be formed by a three-dimensional object printer according to this disclosure.

Additionally, while the cavities 232 and 332 in the bases 200 and 300 have a substantially trapezoidal cross-sectional shape, other cross sectional shapes are also contemplated. FIG. 5 illustrates another exemplary embodiment of a base 400 according to this disclosure that includes first anchoring regions 404A-D and second anchoring regions 406A-D having different exemplary shapes, although other shapes are also contemplated in other embodiments. The substantially trapezoidal shaped regions 404A and 406A are similar to the regions 204 and 206 illustrated in FIG. 2.

The first anchoring regions 404B include a first portion 434B having a substantially ellipsoid shape. In particular, in this embodiment, the first portions 434B have substantially spherical; shapes. The second portions 436B have a substantially linear shape, and can have any acceptable shape, such as a substantially prismatic shape or a substantially cylindrical shape oriented such that a longitudinal direction of the cylindrical shape is substantially perpendicular to the planar layer 102. A cross-sectional area 438B of the first portion 434B is wider than a cross-sectional area 440B of the second portion 436B, such that the second portion 436B forms a neck 460 of a cavity 432B.

The first anchoring regions 404C include a first portion 434C having a substantially cylindrical shape oriented such that a longitudinal direction of the cylindrical shape is substantially perpendicular to the planar layer 102. The second portions 436C have a substantially linear shape, and can have any acceptable shape, such as a substantially prismatic shape or a substantially cylindrical shape oriented such that a longitudinal direction of the cylindrical shape is substantially perpendicular to the planar layer 102. A cross-sectional area 438C of the first portion 434C is wider than a cross-sectional area 440C of the second portion 436C, such that the second anchoring region 406C has a bolt-like shape.

The first anchoring regions 404D include a first portion 434D and a second portion 436d that are contiguous with each other and that together form a cavity 432D having a substantially cylindrical shape 462. The first anchoring regions 404D additionally include a threading 464 that circumscribes longitudinal surfaces 466 of the cavity 432D. The support material of the second anchoring regions 406 fills the cavity 432D and forms a thread 468 engaged with the threading 464 of the cavity 432D.

Figure 6:
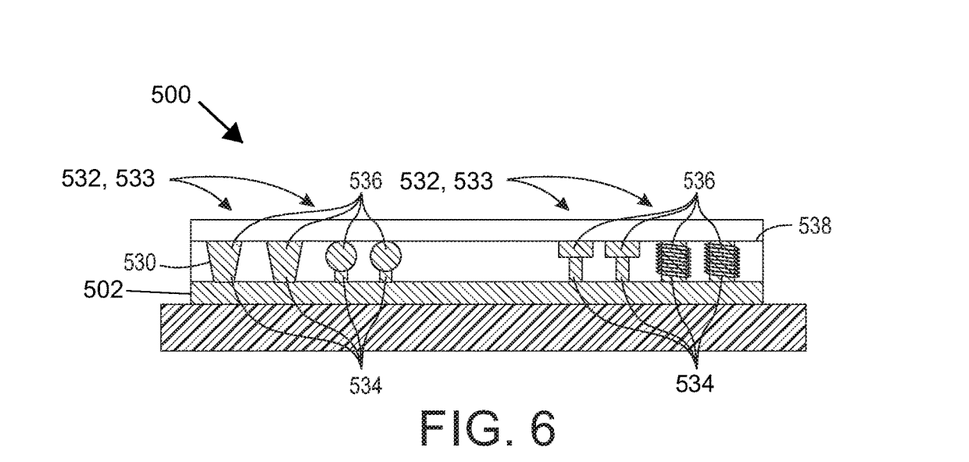

FIG. 6 illustrates another exemplary embodiment of a base 500 according to this disclosure. In this embodiment, rather than defining cavities, the layer 530 of build material that forms the plurality of first anchoring regions 504 defines a plurality of protrusions 532 extending out from the planar layer of build material 502. The protrusions 532 can have a variety of shapes, and include a first portion 534 embedded within the layer 530 and a second portion 536 interposed between the first portion 534 and an upper surface 538 of the layer 530.

The second anchoring portions 506 are formed from portions of support material encasing the protrusions 532 to form cavities 533. Generally, the protrusions have at least a partially concave shape configured to form a form-locking-fit with the support material of the cavities 533. The protrusions 532 are generally oriented to be vertically inverted relative to a correspondingly shaped cavity 432 illustrated in FIG. 5.

Generally, build material is more expensive and less reusable than support material. Therefore, minimizing an amount of build material that is not used to form a three-dimensional object may be beneficial. Using protrusions 532 instead of cavities 232, 432 can decrease an amount of build material used to form a base according to this disclosure.

In another embodiment (not shown) the planar anchoring layer includes a first portion with cavities defined by build material that are filled in with support material, and a second portion with protrusions defined by build material that are encased by cavities formed by support material. In other words, the anchoring layers 412 and 512 from FIGS. 5 and 6 can be combined within a single base. For example, the first and second portions of the anchoring layer can be arranged to correspond to locations of the three-dimensional object being formed that require different amounts of support or warping resistance, or to optimize an amount of build material used in the base.

In addition to defining a planar base for forming a three-dimensional object as disclosed above, the base 100, 200, 400, 500 according to this disclosure is configured to enable removal of the three-dimensional object without damage to the object or to the platen 20. In particular, the configuration of the base according to this disclosure enables the base to support the object without any build material of the base engaging the object. Support material can be removed via any acceptable process, enabling the object to have a base that does not include any protrusion or other discontinuity different from an intended shape.

While the above embodiments illustrate the base disposed directly on a platen 20, in other embodiments, the base can be disposed on an intermediate substrate such as, for example, a disposable planar support that is replaced for each printing operation. In another embodiment, the platen 20 is removable from the printer to facilitate removal of the support material, such as via a different device separate from the printer.

Figure 7:
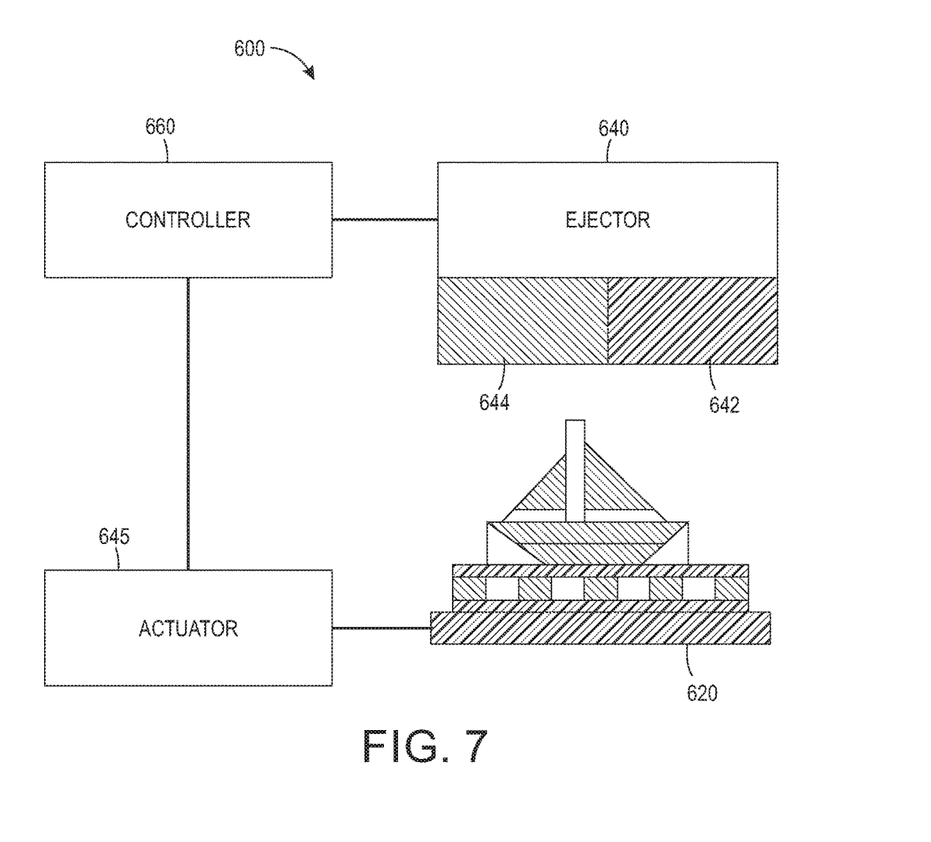
FIG. 7 is a schematic diagram of an additive manufacturing system configured to print a planar base for supporting a three-dimensional object to be formed by the additive manufacturing system according to this disclosure.

FIG. 7 illustrates an exemplary three-dimensional object printer 600 configured to print a base to support a three-dimensional object according to this disclosure. The printer 600 includes a platen 620, an ejector assembly 640, an actuator 645, and a controller 660. The platen 620 can be any acceptable type of platen. The ejector assembly 640 includes at least one ejector head, and is configured to eject drops of build material and support material. In this embodiment, the ejector assembly 640 includes at least one ejector 642 configured to eject drops of build material and at least one ejector 644 configured to eject drops of support material.

In this embodiment, the actuator 645 is operatively connected to the platen 620 to move the ejector assembly 640 and platen 620 relative to each other in one or more dimensions to control the formation of a three-dimensional object. In other embodiments, the actuator 645 is connected to the ejector assembly 640, or the ejector assembly 640 and the platen 620. In a further embodiment, the printer 600 includes a plurality of actuators.

The controller 660 is operatively connected to the actuator 645 and the ejector assembly 640 and is configured to control formation of a base 680 for supporting a three-dimensionally printed object. The controller 660 can also be configured to control formation of a three-dimensional object 690 after formation of the base 680 is complete. In an example, the controller 660 can operate the ejector assembly 640 and the actuator 645 based on preprogrammed instructions, or instructions received from a user, a computer-readable data storage device, a remote computing device, or any other acceptable source.

Figure 8:
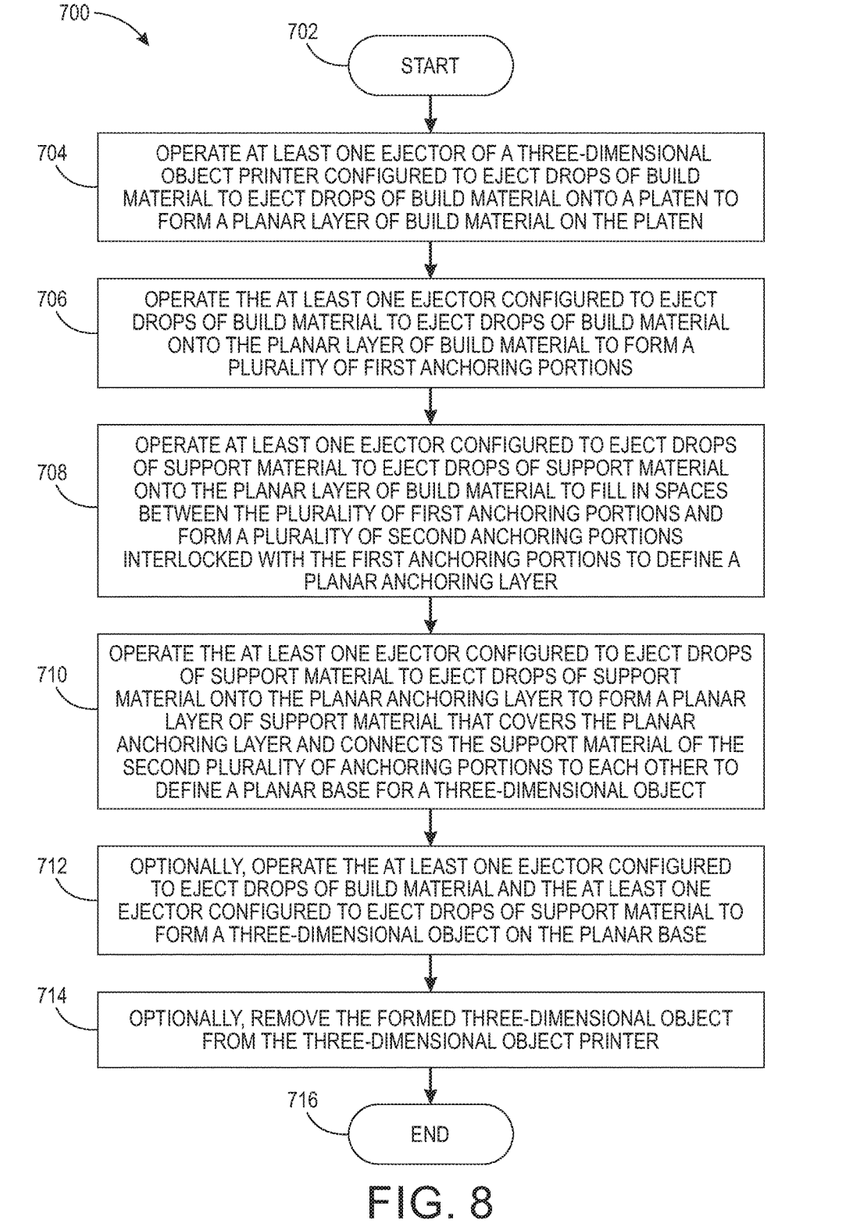
FIG. 8 is a flow diagram illustrating an exemplary methodology for operating an additive manufacturing system to form a planar base for supporting a three-dimensional object to be formed by the additive manufacturing system according to this disclosure.

FIG. 8 is a flow diagram that illustrates an exemplary process 700 for operating the three-dimensional object printer 600 illustrated in FIG. 7. The process is activated before manufacture of an object begins (block 702). At least one ejector of a three-dimensional object printer configured to eject drops of build material is operated to eject drops of build material onto a platen to form a planar layer of build material on the platen (block 704). At least one ejector configured to eject drops of build material is operated to eject drops of build material onto the planar layer of build material to form a plurality of first anchoring portions (block 706).

In one embodiment, forming the plurality of first anchoring regions includes operating at least one ejector of a three-dimensional object printer configured to eject drops of build material to eject drops of build material to form a layer of build material that defines a plurality of cavities, each cavity having a first portion embedded within the layer and a second portion interposed between the first portion and an upper surface of the layer. In another embodiment, the at least one ejector configured to eject drops of build material is operated such that the first portion of each cavity has a cross-sectional area that is wider than a cross-sectional area of the second portion of the cavity. In a further embodiment, the at least one ejector configured to eject drops of build material is operated to form the at least one of the first portion of each cavity and the second portion of each cavity with one of (i) a substantially ellipsoidal shape, (ii) a substantially prismatic shape, or (iii) a substantially cylindrical shape oriented such that a longitudinal direction of the cylindrical shape is substantially perpendicular to the planar layer of build material. In an embodiment, the at least one ejector configured to eject drops of build material is operated to form an inclined thread that circumscribes longitudinal surfaces of the cavity.

In one embodiment forming the plurality of first anchoring portions includes operating at least one ejector of a three-dimensional object printer configured to eject drops of build material to eject drops of build material to form each of the plurality of first anchoring portions from a respective protrusion on the planar layer of build material, where each protrusion has a first portion extending from the planar layer of build material and a second portion extending from the first portion that defines an upper surface of the protrusion. In another embodiment, the at least one ejector configured to eject drops of build material is operated such that the second portion of each protrusion has a cross-sectional area that is wider than a cross-sectional area of the first portion of the protrusion. In a further embodiment, the at least one ejector configured to eject drops of build material is operated to form the at least one of the first portion of each protrusion and the second portion of each protrusion with one of (i) a substantially ellipsoidal shape, (ii) a substantially prismatic shape, or (iii) a substantially cylindrical shape oriented such that a longitudinal direction of the cylindrical shape is substantially perpendicular to the planar layer of build material. In an embodiment, the at least one ejector configured to eject drops of build material is operated to form an inclined thread that circumscribes longitudinal surfaces of the protrusion.

The process 700 continues with at least one ejector configured to eject drops of support material being operated to eject drops of support material onto the planar layer of build material to fill in spaces between the plurality of first anchoring portions and form a plurality of second anchoring portions interlocked with the first anchoring portions (block 708). The plurality of first anchoring portions and the plurality of second anchoring portions together form a planar anchoring layer. The at least one ejector configured to eject drops of support material is also operated to eject drops of support material onto the planar anchoring layer to form a planar layer of support material that covers the planar anchoring layer and connects the support material of the second plurality of anchoring portions to each other (block 710). The planar layer of support material forms a planar base for supporting a three-dimensional object to be formed by the three-dimensional object printer. Optionally, the at least one ejector configured to eject drops of build material and the at least one ejector configured to eject drops of support material are operated to form a three-dimensional object on the planar base (block 712). And, optionally, after the three-dimensional object is formed, the three-dimensional object is removed from the three-dimensional object printer (block 714). Such removal can include mechanically separating the object from the platen or the base. The removal can also include a phase change or dissolution method for removing support material to release the object from the base. In an embodiment, the object is removed along with the base or the platen so that the object can be released from the base with another removal device remote from the printer. The process terminates and the controller can commence manufacture of the object (block 716).

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of operating a three-dimensional object printer to form a base for a three-dimensional object, comprising:

operating with a controller at least one ejector to eject drops of build material onto a platen to form a planar layer of build material on the platen;

operating with the controller the at least one ejector to eject drops of build material onto the planar layer of build material to form a plurality of first anchoring portions by forming a layer of build material on the planar layer of build material that defines a plurality of cavities, each cavity having a first portion embedded within the layer of build material and a second portion interposed between the first portion of each cavity and an upper surface of the layer of build material, and forming an inclined thread that circumscribes a longitudinal surface in each cavity;

operating with the controller the at least one ejector to eject drops of support material onto the planar layer of build material within each cavity to form a plurality of second anchoring portions, the second anchoring portions interlocking with the first anchoring portions in a one-to-one correspondence, the formation of the second anchoring portions including ejecting drops of support material within each cavity to engage the inclined thread within each cavity to interlock the first anchoring portion with the second anchoring portion in each cavity, the plurality of first anchoring portions and the plurality of second anchoring portions together forming a planar anchoring layer; and operating with the controller the at least one ejector to eject drops of support material onto the planar anchoring layer to form a planar layer of support material that covers the planar anchoring layer and connects the support material of the plurality of second anchoring portions to each other, the planar layer of support material forming a planar base for supporting a three-dimensional object to be formed by the three-dimensional object printer.

2. The method of claim 1, the operation of the at least one ejector to eject drops of build material to form the plurality of first anchoring portions further including:

operating with the controller the at least one ejector to form the first portion of each cavity with a cross-sectional area that is wider than a cross-sectional area of the second portion of each cavity.

3. The method of claim 2, the operation of the at least one ejector to eject drops of build material to form each cavity further including:

operating with the controller the at least one ejector to form at least one of the first portion of each cavity and the second portion of each cavity with one of (i) a substantially ellipsoidal shape, (ii) a substantially prismatic shape, or (iii) a substantially cylindrical shape oriented such that a longitudinal direction of the cylindrical shape is substantially perpendicular to the planar layer of build material.

4. The method of claim 1, the operation of the at least one ejector to eject drops of build material to form each cavity further including:

operating with the controller the at least one ejector to form the first portion of each cavity with a predetermined shape; and operating the at least one ejector to eject the drops of support material onto the planar layer of build material within each cavity to form the second anchoring portion within each cavity with a shape that is complementary to the predetermined shape of the cavity.

5. A method of operating a three-dimensional object printer to form a base for a three-dimensional object comprising:

operating with a controller at least one ejector to eject drops of build material onto a platen to form a planar layer of build material on the platen;

operating with the controller the at least one ejector to eject drops of build material onto the planar layer of build material to form a plurality of first anchoring portions, the formation of each first anchoring portion including forming a protrusion on the planar layer of build material, each protrusion having a first portion extending from the planar layer of build material and a second portion extending from the first portion of each protrusion that defines an upper surface of the protrusion and forming an inclined thread that circumscribes a longitudinal surface of each protrusion;

operating with the controller the at least one ejector to eject drops of support material onto the planar layer of build material to form a plurality of second anchoring portions that interlock with the first anchoring portions in a one-to-one correspondence, the plurality of first anchoring portions and the plurality of second anchoring portions together forming a planar anchoring layer and the formation of the second anchoring portions in the plurality of second anchoring portions including ejecting drops of support material to form a layer of support material that defines a plurality of cavities, each cavity encasing one of the protrusions and the drops of support material ejected onto the planar layer of build material that define each cavity engages the inclined thread on the protrusion within each cavity to interlock each protrusion with each cavity in a one-to-one correspondence;

operating with the controller the at least one ejector to eject drops of support material onto the planar anchoring layer to form a planar layer of support material that covers the planar anchoring layer and connects the support material of the plurality of second anchoring portions to each other, the planar layer of support material forming a planar base for supporting a three-dimensional object to be formed by the three-dimensional object printer.

6. The method of claim 5, the formation of the first anchoring portions further including:

operating with the controller the at least one ejector to form the first portion of each protrusion with a cross-sectional area that is wider than a cross-sectional area of the second portion of the protrusion.

7. The method of claim 6, the formation of each protrusion further including:

operating with the controller the at least one ejector to form at least one of the first portion of each protrusion and the second portion of each protrusion with one of (i) a substantially ellipsoidal shape, (ii) a substantially prismatic shape, or (iii) a substantially cylindrical shape oriented such that a longitudinal direction of the cylindrical shape is substantially perpendicular to the planar layer of build material.

8. The method of claim 5, the formation of each protrusion further including:

operating with the controller the at least one ejector to form the second portion of each protrusion with a predetermined shape; and the operation of the at least one ejector to eject drops of support material onto the planar layer of build material encases each predetermined shape.

* * * * *